(12) United States Patent
Bulusu et al.

(10) Patent No.: US 11,269,729 B1
(45) Date of Patent: Mar. 8, 2022

(54) OVERLOADING A BOOT ERROR SIGNALING MECHANISM TO ENABLE ERROR MITIGATION ACTIONS TO BE PERFORMED

(71) Applicant: Microsoft Technology Licensing, LLC, Redmond, WA (US)

(72) Inventors: Mallik Bulusu, Bellevue, WA (US); Ravi Mysore Shantamurthy, Bothell, WA (US); Muhammad Ashfaq Ahmed, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/128,546

(22) Filed: Dec. 21, 2020

(51) Int. Cl.
*G06F 11/00* (2006.01)
*G06F 11/14* (2006.01)
*G06F 9/4401* (2018.01)
*G06F 11/07* (2006.01)
*G06F 11/20* (2006.01)

(52) U.S. Cl.
CPC ........ *G06F 11/1417* (2013.01); *G06F 9/4401* (2013.01); *G06F 11/0772* (2013.01); *G06F 11/0778* (2013.01); *G06F 11/203* (2013.01); *G06F 11/0706* (2013.01); *G06F 11/2035* (2013.01); *G06F 11/2048* (2013.01); *G06F 2201/82* (2013.01)

(58) Field of Classification Search
CPC ............. G06F 11/1417; G06F 11/0778; G06F 11/0772; G06F 11/203; G06F 11/0793; G06F 2201/82; G06F 9/4401
See application file for complete search history.

(56) References Cited

U.S. PATENT DOCUMENTS

| 8,132,057 B2* | 3/2012 | Jann ..................... G06F 11/0793 714/38.1 |
| 8,671,405 B2 | 3/2014 | Nicholas et al. |
| 8,775,781 B2 | 7/2014 | Warkentin et al. |

(Continued)

OTHER PUBLICATIONS

"Advanced Configuration and Power Interface (ACPI) Specification", Retrieved from: https://www.uefi.org/sites/default/files/resources/ACPI%206_2_A_Sept29.pdf, Sep. 2017, 1177 Pages.

(Continued)

*Primary Examiner* — Marc Duncan
(74) *Attorney, Agent, or Firm* — Ray Quinney & Nebeker P.C; James Bullough

(57) ABSTRACT

A computing device, such as a server in a cloud computing system, can be configured to enable error mitigation actions to be performed when the computing device experiences a failure. The computing device includes firmware that can be configured to detect an error indication during a boot sequence of the server, determine at least one desired error mitigation action based at least in part on the error indication, and create a boot error record that identifies the at least one desired error mitigation action. The computing device also includes an operating system that can be configured to obtain the boot error record during the boot sequence and cause the at least one desired error mitigation action that is identified in the boot error record to be performed.

20 Claims, 7 Drawing Sheets

(56) References Cited

U.S. PATENT DOCUMENTS

| | | | |
|---|---|---|---|
| 10,013,274 B2 | | 7/2018 | Coles et al. |
| 10,387,261 B2 | * | 8/2019 | Debata ................ G06F 11/0778 |
| 10,705,939 B2 | | 7/2020 | Mcchord et al. |
| 2014/0372740 A1 | * | 12/2014 | Semenko ............ G06F 11/0766 |
| | | | 713/2 |
| 2016/0342477 A1 | * | 11/2016 | Swierk ................. G06F 9/4406 |
| 2018/0074884 A1 | * | 3/2018 | Cady ................... G06F 11/0787 |
| 2018/0165101 A1 | | 6/2018 | Bulusu et al. |
| 2021/0182136 A1 | * | 6/2021 | Song ................... G06F 11/0793 |
| 2021/0191795 A1 | * | 6/2021 | Misra ................... G06F 1/3203 |
| 2021/0240561 A1 | * | 8/2021 | Shah ................... G06F 11/0751 |

OTHER PUBLICATIONS

Deshpande, Nataraj, "Crash: Generate ACPI APEI BERT Dumps", Retrieved from: https://chromium-review.googlesource.com/c/chromiumos/platform2/+/767107/, Nov. 16, 2018, 4 Pages.

Tu, et al., "How to use boot diagnostics to troubleshoot virtual machines in Azure", Retrieved from: https://docs.microsoft.com/en-us/azure/virtual-machines/troubleshooting/boot-diagnostics, Oct. 31, 2018, 5 Pages.

* cited by examiner

OVERLOADING A BOOT ERROR SIGNALING MECHANISM TO ENABLE ERROR MITIGATION ACTIONS TO BE PERFORMED

CROSS-REFERENCE TO RELATED APPLICATIONS

N/A

BACKGROUND

Cloud computing is the delivery of computing services over the internet. Some examples of computing services that can be provided by a cloud computing system include storage, databases, networking, software, and analytics. The use of cloud computing technology has grown rapidly in recent years, due at least in part to the development of high-capacity networks as well as relatively low-cost computers and storage devices.

Broadly speaking, a cloud computing system includes two sections, a front end and a back end, that are in communication with one another via the internet. The front end includes the interface that users encounter through a client device. The back end includes the resources that deliver cloud-computing services, including processors, memory, storage, and networking hardware. These resources are connected by one or more communication networks. Advantageously, the group of networked elements providing services does not have to be individually addressed or managed by users. Instead, the entire provider-managed suite of hardware and software can be thought of as a "cloud."

The back end of a cloud computing system typically includes one or more datacenters. A datacenter is a physical facility that is used to house computing systems and associated components. A datacenter typically includes a large number of computing systems (e.g., servers), which can be stacked in racks that are placed in rows. An entity that owns and/or operates a cloud computing system can be referred to as a cloud computing provider. A cloud computing provider can have a plurality of datacenters, and these datacenters can be located in different geographical areas.

A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users generally occurs via the internet.

There are many different types of services that cloud computing providers can offer to customers. One type of cloud computing service is referred to as Infrastructure as a Service (IaaS). IaaS is a form of cloud computing that delivers compute, network, and storage resources to consumers on-demand, over the internet. IaaS enables end users to scale and shrink resources on an as-needed basis, reducing the need for large, up-front capital expenditures. This can be particularly beneficial for users who anticipate having variable workloads.

In a typical IaaS scenario, customers rent the use of virtual machines that run on servers maintained by the cloud computing provider. In this context, the term "server" refers to a physical computer system, while the term "virtual machine" refers to an emulation of a computer system on a server. In other words, a virtual machine is a program running on a server that acts like a virtual computer. Like a physical computer, a virtual machine runs an operating system and one or more applications.

In the scenario just described, virtual machines that are being rented by different customers can run on the same server. However, in another IaaS scenario, a cloud computing provider can rent entire servers to customers. A server that has a single tenant can be referred to as a "bare-metal server." In other words, a bare-metal server is dedicated entirely to a single customer who is renting the bare-metal server (instead of being shared between customers).

In another typical IaaS scenario, customers rent the use of containers that run on servers maintained by the cloud computing provider. Containerization is an approach to software development in which an application and everything that it needs, such as libraries and other dependencies, are packaged together as a standard unit that is referred to as a container image. When a container image is deployed, it is referred to as a container. The use of containers allows applications to run properly in a variety of different computing environments, regardless of any customized settings that a particular computing environment might have that could differ from the computing environment used for writing and testing the application. Containers also isolate applications from one another on a shared operating system. Containers provide most of the isolation of virtual machines at a small fraction of the computing power.

SUMMARY

In accordance with one aspect of the present disclosure, a method is disclosed that includes enabling error mitigation actions to be performed when a computing device experiences a failure. The method is implemented by firmware in the computing device. The method includes detecting an error indication during a boot sequence of the computing device. The boot sequence occurs subsequent to a warm reboot of the computing device. The boot sequence occurs while memory in the computing device is in a self-refresh mode. The method further includes determining at least one desired error mitigation action based at least in part on the error indication. The method further includes creating a boot error record that identifies the at least one desired error mitigation action. The method further includes making the boot error record available to an operating system of the computing device.

Detecting the error indication may include detecting an error flag at a pre-determined location in the memory of the computing device.

A data structure associated with the error flag may identify at least one memory address range. The at least one desired error mitigation action may include sending memory contents from the at least one memory address range to an error analysis system.

Detecting the error indication may include querying an auxiliary service processor in the computing device.

The at least one desired error mitigation action may include sending error context to an error analysis system.

A plurality of instances of user context may be running on the computing device. The at least one desired error mitigation action may include migrating at least one of the plurality of instances of user context to another computing device.

The at least one desired error mitigation action may include locking the computing device for hardware debugging.

In accordance with one aspect of the present disclosure, a method is disclosed for enabling error mitigation actions to be performed when a computing device experiences a failure. The method is implemented by an operating system in the computing device. The method includes obtaining a boot error record during a boot sequence of the computing device. The boot sequence occurs subsequent to a warm reboot of the computing device. The boot sequence occurs while memory in the computing device is in a self-refresh mode. The boot error record is created earlier in the boot sequence by firmware of the computing device. The method further includes determining at least one desired error mitigation action that is identified in the boot error record. The method further includes causing the at least one desired error mitigation action to be performed.

Causing the at least one desired error mitigation action to be performed may include causing error context to be sent to an error analysis system.

The computing device may be a server that is part of a cloud computing system. A plurality of instances of user context may be running on the server. Causing the at least one desired error mitigation action to be performed may include causing at least one of the plurality of instances of user context to be migrated to another server.

Causing the at least one desired error mitigation action to be performed may include causing the computing device to be locked for hardware debugging.

Obtaining the boot error record may include searching a pre-determined memory location that is known to both the operating system and the firmware in the computing device.

The boot error record may include a plurality of action identifiers corresponding to a plurality of error mitigation actions to be performed. The method may additionally include accessing one or more data structures that associate the plurality of action identifiers with instructions that, when executed, cause the plurality of error mitigation actions to be performed.

In accordance with another aspect of the present disclosure, a server in a cloud computing system is disclosed. The server is configured to enable error mitigation actions to be performed when the server experiences a failure. The server includes one or more processors, memory in electronic communication with the one or more processors, and firmware including a boot error generator. The boot error generator is executable by the one or more processors to detect an error indication during a boot sequence of the server. The boot sequence occurs subsequent to a warm reboot of the server. The boot sequence occurs while the memory is in a self-refresh mode. The boot error generator is also executable by the one or more processors to determine at least one desired error mitigation action based at least in part on the error indication. The boot error generator is also executable by the one or more processors to create a boot error record that identifies the at least one desired error mitigation action. The server also includes an operating system that includes a boot error handler that is executable by the one or more processors to obtain the boot error record during the boot sequence and cause the at least one desired error mitigation action that is identified in the boot error record to be performed.

Detecting the error indication may include detecting an error flag at a pre-determined location in the memory of the server.

A data structure associated with the error flag may identify at least one memory address range. The at least one desired error mitigation action may include causing memory contents from the at least one memory address range to be sent to an error analysis system.

The server may further include an auxiliary service processor. Detecting the error indication may include querying the auxiliary service processor.

Causing the at least one desired error mitigation action to be performed may include causing error context to be sent to an error analysis system.

The server may further include a plurality of instances of user context that are running on the server. Causing the at least one desired error mitigation action to be performed may include causing at least one of the plurality of instances of user context to be migrated to another server.

Causing the at least one desired error mitigation action to be performed may include causing the server to be locked for hardware debugging.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
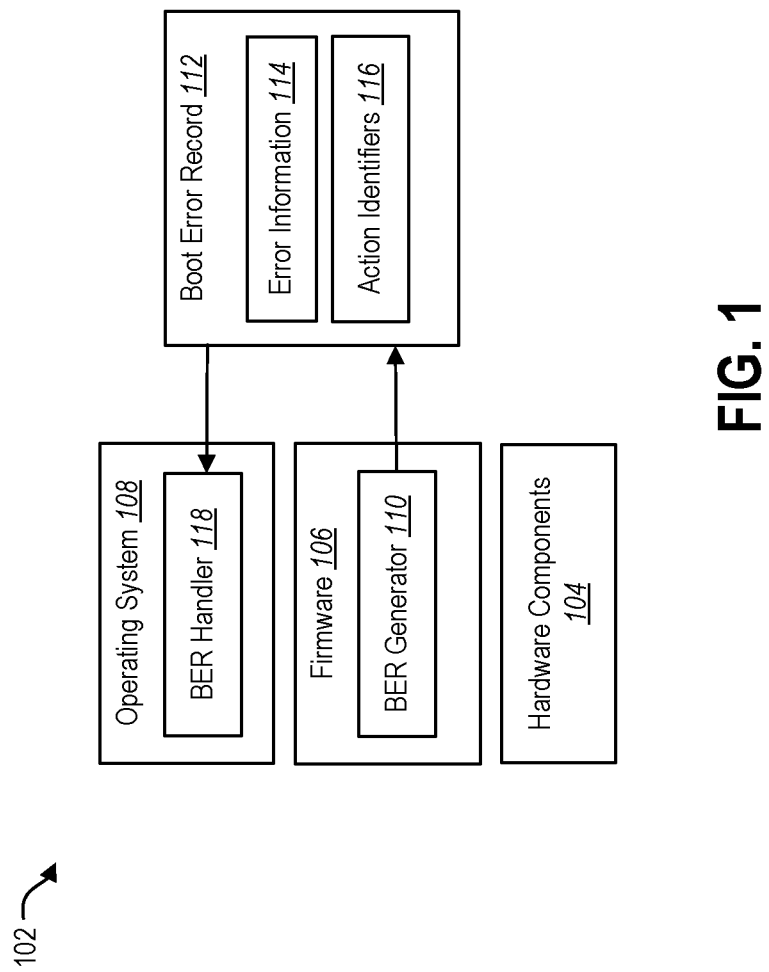
FIG. 1 illustrates aspects of a computing device that can be configured to implement the techniques disclosed herein.

From time to time, a server in a cloud computing system can experience an unexpected failure. There are many different reasons why a server can fail. For example, a failure can occur when a computer program such as a software application or an operating system stops functioning properly. As another example, a failure can be caused by the malfunctioning of one or more hardware components.

It can be desirable to take certain actions when a failure occurs. For example, it can be desirable to capture error context. The term "error context" can refer to some or all of the contents of the server's memory when a failure occurs. Analyzing the error context can provide clues as to the cause of the server's failure. When a server experiences a failure, it can be desirable to capture the error context and send the error context to a remote location for analysis. This is sometimes referred to as performing a crash dump.

As another example, if a server that is running one or more instances of user context experiences a failure, it can be desirable to migrate that user context to another server in order to limit the extent to which users experience interruption to their service. Migrating the user context to another server can be particularly desirable if the server's failure is caused by the failure of one or more hardware components.

The term "user context" can refer to some or all of the contents of the server's memory that are related to work being performed by a user. Some examples of user context include virtual machines and containers. As discussed above, these examples of user context can be relevant to an IaaS scenario in which customers rent the use of virtual machines and/or containers from a public cloud computing provider.

Both of the actions just described (sending error context to a remote location for analysis, and migrating user context to another server) can involve sending large amounts of data over a network connection. However, when a server experiences a failure, the failure can cause the server's input/output (I/O) subsystem to be in a reduced functionality mode. This can make it difficult or even impossible to take actions like those just described.

The present disclosure proposes techniques for enabling certain error mitigation actions (such as sending error context to a remote location for analysis, and/or migrating user context to another server) to be performed when a server in a cloud computing system experiences a failure. In accordance with at least some embodiments of the present disclosure, when a server experiences a failure, a warm reboot can be performed while the server's memory is in a self-refresh mode. Then, a boot error record that is created during the subsequent boot sequence can be overloaded with additional information that identifies at least one desired error mitigation action to be performed by the server's operating system. In this context, the term "overload," when used in connection with a boot error record, can refer to including additional information in the boot error record beyond what is typically included in the boot error record. This will be described in greater detail below.

The term "boot sequence" refers to the initial sequence of operations that a computing device performs when it starts. In a typical boot sequence, the central processing unit (CPU) executes firmware, which is stored in non-volatile memory. Examples of firmware include the Basic Input/Output System (BIOS) and the Unified Extensible Firmware Interface (UEFI). The firmware initializes the hardware components of the computing device, locates the operating system in non-volatile memory, loads the operating system into volatile memory (e.g., random access memory (RAM)), and transfers control to the operating system.

The term "warm reboot" can refer to restarting a computing device that is already powered on without interrupting its supply of power. In contrast, a "cold boot" is a boot sequence in which a computing device starts up from a completely powerless state. A warm reboot can alternatively be referred to as a soft reboot, a warm reset, or a warm restart.

The term "self-refresh mode" can refer to a mode of operation of a memory device in which the contents of the memory device are preserved across a warm reboot. Therefore, when a warm reboot is performed after a server has experienced a failure, the contents of the memory as they existed just prior to the failure are still available during the subsequent boot sequence.

The term "boot error record" can refer to one or more data structures that can be created by firmware during a server's boot sequence. A boot error record can be thought of as a kind of signaling mechanism for notifying other entities in a computing device (e.g., the operating system) about errors that have been detected during the boot sequence. One example of a boot error record is the Boot Error Record Table (BERT), which is defined in the Advanced Configuration and Power Interface (ACPI) standard.

Currently, boot error records (such as BERT) only include information about errors that have been detected. They do not include any information about actions that should be performed in response to the error(s). The present disclosure proposes overloading a boot error record with additional information about actions that should be performed in response to the error(s) that have been detected. Such actions may be referred to herein as error mitigation actions because they generally alleviate the effects of the error(s). When the operating system receives a boot error record that has been overloaded with this additional information, the operating system can cause some or all of the desired error mitigation actions to be performed.

For example, in accordance with the techniques disclosed herein, a boot error record can be modified to include an indication that error context should be sent to a remote location for analysis and/or an indication that one or more instances of user context should be migrated to another server. When an operating system obtains the boot error record, the operating system can perform one or both of these error mitigation actions. Because a warm reboot was performed with the server's memory in a self-refresh mode following the failure, the contents of the memory as they existed just prior to the failure are still stored in memory during the subsequent boot sequence. Therefore, any error context that was available at the time of the failure is still stored in memory during the subsequent boot sequence and can be sent to a remote location for analysis. Similarly, all of the instances of user context (e.g., VMs, containers) that were running on the server prior to the failure are still stored in the memory during the subsequent boot sequence, thereby making it possible to migrate some or all of the instances of user context to a different server.

FIG. 1 illustrates aspects of a computing device 102 that can be configured to implement the techniques disclosed herein. In some embodiments, the computing device 102 can be a server that is part of a cloud computing system.

The computing device 102 includes various hardware components 104. Some examples of hardware components 104 that can be included in the computing device 102 include one or more processors, memory, storage, an I/O subsystem, one or more communication interfaces, and a display controller.

The computing device 102 also includes firmware 106. The firmware 106 is a specific class of computer software that provides low-level control for the hardware components 104 of the computing device 102. The firmware 106 can be stored in non-volatile memory devices such as read-only memory (ROM), erasable programmable ROM (EPROM), or electrically erasable programmable ROM (EEPROM). The firmware 106 can be used to initialize the hardware components 104 during a boot sequence of the computing device 102, and also to provide runtime services for the operating system 108 and programs that run on the computing device 102. Examples of firmware 106 include the Basic Input/Output System (BIOS) and the Unified Extensible Firmware Interface (UEFI).

The computing device 102 also includes an operating system 108. The operating system 108 is system software that manages hardware and software resources and provides common services for programs running on the computing device 102. After being loaded into memory by a boot program, the operating system 108 manages the other programs running on the computing device 102. For certain hardware functions (e.g., input and output and memory allocation), the operating system 108 can act as an intermediary between programs running on the computing device 102 and the hardware components 104 of the computing device 102. The operating system 108 enables programs to interact with the hardware components 104 without needing to know any details about the hardware components 104.

The firmware 106 includes a boot error record (BER) generator 110 that can be configured to generate a boot error record 112 during a boot sequence of the computing device 102. The boot error record 112 can include error information 114 and one or more action identifiers 116. An example of the operations that can be performed by the BER generator 110 will be described below in connection with FIG. 2.

The operating system 108 includes a BER handler 118 that can be configured to process the boot error record 112 that is created by the BER generator 110 within the firmware 106. In some embodiments, the BER handler 118 can be configured to process the boot error record 112 during the same boot sequence in which the BER generator 110 creates the boot error record 112. In other words, the BER generator 110 can create the boot error record 112 during a boot sequence of the computing device 102. The BER generator 110 can also make the boot error record 112 available to the operating system 108. Then, later in the same boot sequence, the BER handler 118 can process the boot error record 112. An example of the operations that can be performed by the BER handler 118 will be described below in connection with FIG. 3.

Figure 2:
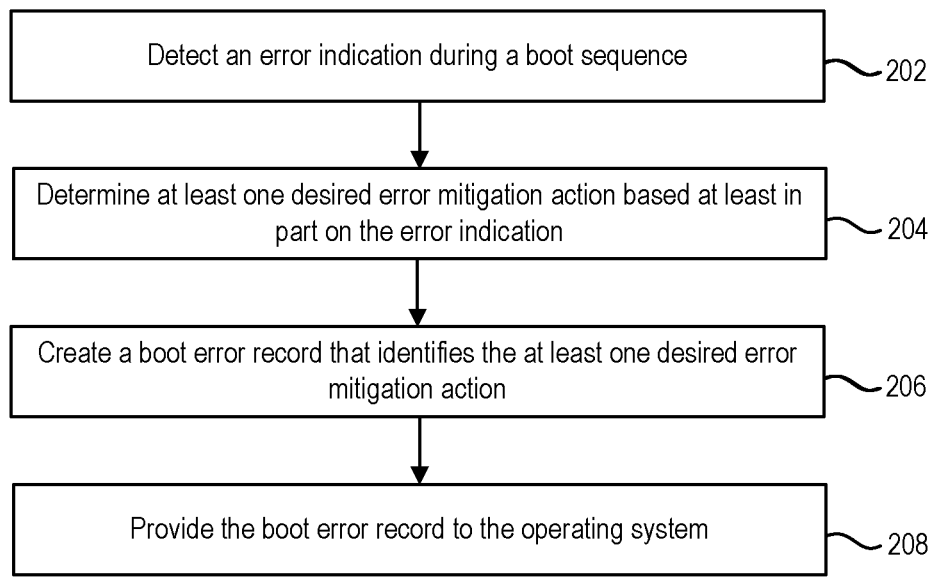
FIG. 2 illustrates an example of a method that can be performed by firmware of a computing device to enable certain error mitigation actions to be performed when the computing device experiences a failure.

FIG. 2 illustrates an example of a method 200 for enabling certain error mitigation actions to be performed when a computing device 102 experiences a failure. The method 200 will be described in relation to the computing device 102 shown in FIG. 1. The method 200 can be implemented by the firmware 106 in the computing device 102. In particular, the method 200 can be implemented by the BER generator 110 within the firmware 106.

The method 200 can be performed during a boot sequence of the computing device 102 that occurs subsequent to a failure of the computing device 102. A warm reboot of the computing device 102 can be performed in response to the failure, and the boot sequence can occur in response to the warm reboot of the computing device 102. The memory in the computing device 102 can be in a self-refresh mode when the failure occurs and also during the subsequent warm reboot of the computing device 102.

The method 200 can include detecting 202 an error indication. Detecting an error indication can include discovering or learning about the presence of something on the computing device 102 that indicates that one or more errors have occurred. For example, detecting an error indication can include detecting an error flag at a pre-determined location in the memory of the computing device 102. As another example, detecting an error indication can include querying an auxiliary service processor that is located on the computing device 102. As another example, detecting an error indication can include querying error states of hardware components 104 in the computing device 102. These examples will be described in greater detail below.

The method 200 can also include determining 204 at least one desired error mitigation action that should be performed in response to detecting 202 the error indication. The type of error mitigation action can be based at least in part on the error indication that is detected. In other words, the type of error indication that is detected 202 can influence the type of error mitigation action that the BER generator 110 determines 204 should be performed.

For example, if the error indication suggests that one or more software errors have occurred on the computing device 102, the BER generator 110 can determine that error context should be sent to a remote location for analysis. In some situations, the BER generator 110 can determine that the entire contents of the memory of the computing device 102 should be sent to a remote location for analysis in response to detecting an error indication. The entire contents of the memory of the computing device 102 can include the content of CPU registers. In other situations, the BER generator 110 can determine that only some of the contents of the memory of the computing device 102 should be sent to a remote location for analysis in response to detecting an error indication.

Another example is related to a scenario in which the computing device 102 is a server that is part of a cloud computing system, and one or more instances of user context (e.g., VMs, containers) are running on the server. In such a scenario, if the error indication suggests that one or more hardware errors have occurred on the server, the BER generator 110 can determine that at least some of the instances of user context that are running on the server should be migrated to another server. In some embodiments, the BER generator 110 can also determine that the server should be locked for hardware debugging. Thus, migrating one or more instances of user context to another server and locking the server for hardware debugging are additional examples of desired error mitigation actions that can be determined in response to detecting an error indication.

In some embodiments, the firmware 106 can factor in the frequency of errors that have occurred on a particular server to determine if one or more instances of user context (e.g., VMs, containers) should be migrated to another server. For example, a server could experience errors (which could be software errors and/or hardware errors) that are not considered to be sufficiently serious to cause instances of user context to be migrated to another server. However, if the errors are experienced frequently enough, the firmware 106 could conclude that the frequency of the errors is enough to justify migrating instances of user context to another server. In some embodiments, if the number of errors experienced by a particular server exceeds a defined threshold value within a defined time period, the firmware 106 can conclude that one or more instances of user context should be migrated to another server. This migration of user context can occur in addition to sending error context to a remote location for analysis.

Similarly, the firmware 106 can factor in the frequency of warm resets that have occurred on a particular server to determine if one or more instances of user context should be migrated to another server. For example, if the number of warm resets that a server experiences within a defined time period exceeds a defined threshold value, the firmware 106 can conclude that one or more instances of user context should be migrated to another server. As before, this migration of user context can occur in addition to sending error context to a remote location for analysis.

The method 200 can also include creating 206 at least one boot error record 112 that identifies the desired error mitigation action(s) that were determined 204. As shown in FIG. 1, the boot error record 112 can include error information 114 and one or more action identifiers 116. The error information 114 can include information about the error indication that is detected 202 during the boot sequence. As discussed above, the error indication can be anything that indicates that one or more errors have occurred on the computing device 102. In some embodiments, the error information 114 in the boot error record 112 can describe a cause of the failure that the computing device 102 experienced. The action identifiers 116 can include information identifying one or more actions that should be taken in response to the error indication (as previously determined 204 by the BER generator 110). In some embodiments, the action identifiers 116 can include information about one or more actions that should be taken by the operating system 108 in response to the error indication.

The method 200 can also include providing 208 the boot error record 112 to the operating system 108. In some embodiments, providing 208 the boot error record 112 to the operating system 108 can include storing the boot error record 112 in a pre-determined memory location that is known to both the firmware 106 and to the operating system 108. The pre-determined memory location can be dedicated to storing boot error records 112. Alternatively, providing 208 the boot error record 112 to the operating system 108 can include storing the boot error record 112 in a memory location (which may not necessarily be known to the operating system 108) and then notifying the operating system 108 about the memory location of the boot error record 112. There are many different ways that the firmware 106 can notify the operating system 108 about the location of the boot error record 112. For example, the firmware 106 can write the location of the boot error record 112 to a pre-determined location that is known to both the firmware 106 and to the operating system 108.

Figure 3:
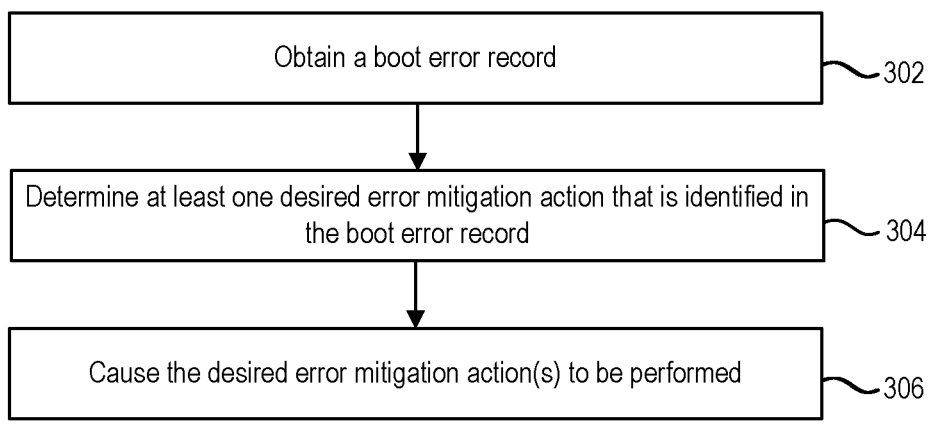
FIG. 3 illustrates an example of a method that can be performed by an operating system of a computing device to enable certain error mitigation actions to be performed when the computing device experiences a failure.

FIG. 3 illustrates another example of a method 300 for enabling certain error mitigation actions to be performed when a computing device 102 experiences a failure. The method 300 shown in FIG. 3 will be described in relation to the computing device 102 shown in FIG. 1. The method 300 can be implemented by the operating system 108 in the computing device 102. In particular, the method 300 can be implemented by the BER handler 118 within the operating system 108.

Like the method 200 that was described above in connection with FIG. 2, the method 300 shown in FIG. 3 can be performed during a boot sequence of the computing device 102 that occurs subsequent to a failure of the computing device 102. The boot sequence can occur in response to a warm reboot of the computing device 102 following the failure. The memory in the computing device 102 can be in a self-refresh mode when the failure occurs and also during the subsequent warm reboot of the computing device 102.

The method 300 can include obtaining 302 a boot error record 112. There are many different ways that the boot error record 112 can be obtained 302. In some embodiments, after the operating system 108 has been loaded into memory, the BER handler 118 can search for a boot error record 112 in a pre-determined memory location that is known to both the firmware 106 and the operating system 108. If the BER handler 118 finds the boot error record 112 in the pre-determined memory location, then the boot error record 112 can be processed as described in the remainder of the method 300. In other embodiments, the pre-determined memory location can include the location of the boot error record 112 instead of the boot error record 112 itself. In other words, the BER handler 118 can look in the pre-determined memory location to see if the pre-determined memory location identifies the location of a boot error record 112. If it does, then the BER handler 118 can obtain 302 the boot error record 112 by accessing the identified location.

The method 300 can also include determining 304 at least one desired error mitigation action that is identified in the boot error record 112. As discussed above, the boot error record 112 can include one or more action identifiers 116. The action identifiers 116 can identify one or more error mitigation actions that should be taken in response to the error indication that was detected by the firmware 106. In some embodiments, determining 304 at least one desired error mitigation action that is identified in the boot error record 112 can include locating one or more action identifiers 116 in the boot error record 112 and then determining the error mitigation action(s) that correspond to the action identifier(s) 116.

Once at least one desired error mitigation action has been determined 304, the method 300 can also include causing 306 the desired error mitigation action(s) to be performed. In some embodiments, causing 306 a particular error mitigation action to be performed can include performing the error mitigation action in whole or in part. In some embodiments, causing 306 a particular error mitigation action to be performed can include notifying another component or entity (within the computing device 102 and/or external to the computing device 102) about the error mitigation action. If the computing device 102 is a server that is part of a cloud computing system, causing 306 a particular error mitigation action to be performed can include communicating with a fabric controller. A fabric controller can be configured to perform management operations with respect to the servers that are part of a cloud computing system.

For example, suppose that the boot error record 112 includes an action identifier 116 corresponding to the action of migrating one or more instances of user context (e.g., VMs, containers) that are running on the server to another server. Causing 306 this error mitigation action to be performed can include notifying the fabric controller that the instance(s) of user context should be migrated. Similarly, if the boot error record 112 includes an action identifier 116 corresponding to the action of locking the server for hardware debugging, causing 306 this error mitigation action to be performed can include notifying the fabric controller that the server should be locked.

Locking a server for hardware debugging can include preventing new instances of user context from being assigned to the server. As noted above, a cloud computing provider can rent the use of various kinds of user context (e.g., VMs, containers) on its servers to customers. The cloud computing provider can provide an interface that customers can access through client devices. When a customer wants to rent the use of one or more instances of user context from the cloud computing system, the customer can access the interface and submit a request along with any other information (e.g., payment information) that is requested in order to proceed. If the request is approved by the cloud computing provider, then at some point the user context that the customer wants to rent will be assigned to one or more specific servers. The fabric controller can perform the task of deciding which server(s) will be assigned to host the user context that the customer is renting. When a server is locked for hardware debugging, this can mean that no new instances of user context should be assigned to the server long as the server remains locked. The fabric controller can keep track of which servers have been locked for hardware debugging. For example, the fabric controller can maintain a list of locked servers. When a customer has ordered one or more new instances of user context and the fabric controller is assigning the new instance(s) of user context to one or more servers, the fabric controller can check the list of locked servers and not assign the new instance(s) of user context to any of the servers on the list. Thus, if a boot error record 112 includes an action identifier 116 corresponding to the action of locking a server for hardware debugging, causing 306 this error mitigation action to be performed can include notifying the fabric controller that the server should be added to the list of locked servers.

Figure 4:
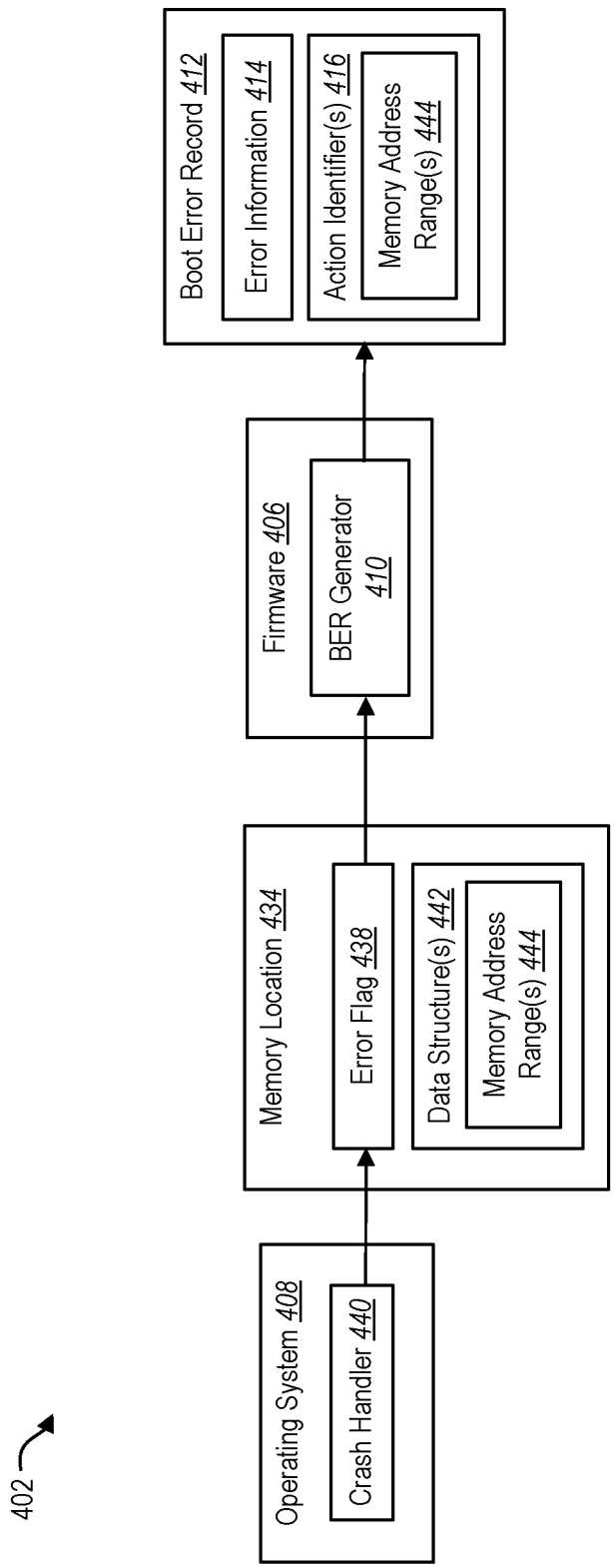
FIG. 4 illustrates an example showing how a boot error record generator in the firmware of a computing device can detect an error indication during a boot sequence.

FIG. 4 illustrates an example showing how a BER generator 410 in the firmware 406 of a computing device 402 can detect an error indication during a boot sequence. In the depicted example, the BER generator 410 can be configured to search a particular memory location 434 in the memory of the computing device 402 during a boot sequence of the computing device 402. If the BER generator 410 finds an error flag 438 in this memory location 434, the BER generator 410 can be configured to interpret the error flag 438 as an error indication. In other words, the BER generator 410 can be configured to interpret the presence of the error flag 438 as an indication that the computing device 402 has experienced one or more errors and that a boot error record 412 should be created.

In some embodiments, the error flag 438 can be set by the operating system 408 in the computing device 402. In the depicted example, the operating system 408 is shown with a crash handler 440 that is configured to set the error flag 438. In some embodiments, the error flag 438 can be set by the operating system 408 after the computing device 402 has experienced a failure and before a warm reboot of the computing device 402 is performed. In addition to setting the error flag 438, the operating system 408 can also indicate the nature of the desired error mitigation actions that should be performed (e.g., sending error context to a remote location, migrating one or more instances of user context to another server, locking the server for hardware debugging). Information about the desired error mitigation actions can be saved in the memory location 434 along with the error flag 438, or it can be saved in a different memory location.

In some embodiments, the memory location 434 where the error flag 438 is set can be a location within non-volatile memory. For example, the memory location 434 can be a location within the non-volatile memory that stores the firmware 406.

In some embodiments, the memory location 434 where the error flag 438 is set can be pre-determined by the firmware 406 and the operating system 408 of the computing device 402. In this context, the term "pre-determined" can refer to a memory location 434 that the firmware 406 and the operating system 408 of the computing device 402 decide upon in advance. In other words, the memory location 434 can be known to both the firmware 406 and the operating system 408 as the location for the error flag 438 before the error flag 438 is set.

Although just a single error flag 438 is shown in FIG. 4, in some embodiments a plurality of error flags 438 can be set corresponding to different errors that occur on the computing device 402.

In some embodiments, the error flag 438 can be set by invoking a service that is exposed by the firmware 406. For example, if the firmware 406 is UEFI, the error flag 438 can be set by invoking an update capsule service that is exposed by the UEFI.

As discussed above, in response to detecting the error flag 438, the BER generator 410 can determine at least one desired error mitigation action that should be performed. The BER generator 410 can also create a boot error record 412. The boot error record 412 can include error information 414 as well as one or more action identifiers 416 that identify the error mitigation action(s) that the BER generator 410 determines should be performed.

As also discussed above, the BER generator 410 can, in response to detecting the error flag 438, determine that error context should be sent to a remote location for analysis. The error context can include some or all of the contents of the memory of the computing device 402.

In some embodiments, the error flag 438 can be associated with one or more data structures 442 that identify one or more memory address ranges 444. In such embodiments, the BER generator 410 can determine that the contents of the memory corresponding to the memory address range(s) 444 should be sent to a remote location for analysis. In some embodiments, the BER generator 410 can interpret the presence of the data structure(s) 442 specifying the memory address range(s) 444 as an indication that only the contents of the memory corresponding to the specified memory address range(s) 444 should be sent to a remote location for analysis, and the contents of the memory outside of the specified memory address range(s) 444 should not be sent to a remote location for analysis. In other words, the BER generator 410 can interpret the presence of the data structure(s) 442 specifying the memory address range(s) 444 as an indication that only a subset of the contents of the memory should be sent to a remote location for analysis, and that the specified memory address range(s) 444 identify the subset. The BER generator 410 can include the memory address range(s) 444 in the action identifier(s) 416 that are included in the boot error record 412.

In some embodiments, the BER generator 410 can be configured to determine whether some of the contents of the memory or all of the contents of the memory are sent to a remote location for analysis based on the presence or absence of the data structure(s) 442 specifying memory address range(s) 444 in connection with the error flag 438. In other words, if the BER generator 410 detects the error flag 438 but does not detect any data structures 442 specifying any memory address ranges 444 in connection with the error flag 438, the BER generator 410 can create an action identifier 416 that will cause the operating system 408 to send all of the contents of the memory to a remote location for analysis. On the other hand, if the BER generator 410 detects the error flag 438 and also detects one or more memory address ranges 444 in connection with the error flag 438, the BER generator 410 can create an action identifier 416 that will cause the operating system 408 to send only the contents of the memory corresponding to the specified memory address range(s) 444 to a remote location for analysis.

In the depicted embodiment, the error flag 438 and the data structure(s) 442 that identify the memory address range(s) 444 are shown in the same memory location 434. Alternatively, the error flag 438 and the data structure(s) 442 that identify the memory address range(s) 444 can be in different memory locations. In some embodiments, the memory location 434 can include the error flag 438 and a pointer to the data structure(s) 442 that identify the memory address range(s) 444.

Figure 5:
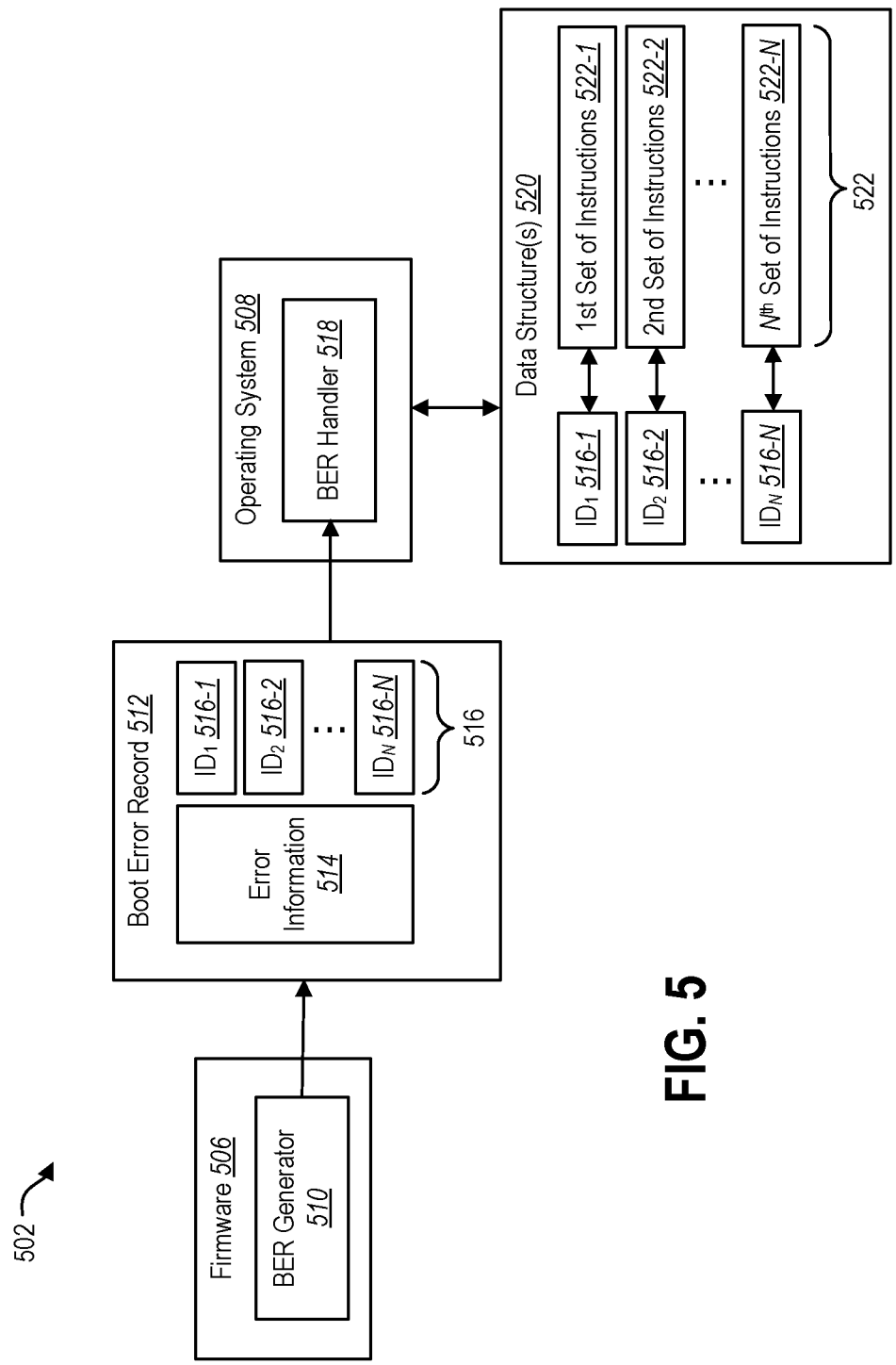
FIG. 5 illustrates an example showing how a boot error record handler in the operating system of a computing device can determine at least one desired error mitigation action that is identified in a boot error record and cause the desired error mitigation action(s) to be performed.

FIG. 5 illustrates an example showing how a BER handler 518 in the operating system 508 of a computing device 502 can determine at least one desired error mitigation action that is identified in a boot error record 512 and cause the desired error mitigation action(s) to be performed.

In the depicted example, the boot error record 512 includes error information 514 and N action identifiers 516 corresponding to N error mitigation actions that should be performed in response to detecting an error indication during a boot sequence of the computing device 502. The value of N can be any integer greater than or equal to zero. As discussed above, there are many different types of error mitigation actions that can be performed in accordance with the techniques disclosed herein. For example, the first action identifier 516-1 can correspond to the error mitigation action of sending error context to a remote location for analysis, the second action identifier 516-2 can correspond to the error mitigation action of migrating one or more instances of user context that are running on the computing device 502 to another computing device (e.g., another server), and the $N^{th}$ action identifier 516-N can correspond to the error mitigation action of locking the computing device 502 for hardware debugging.

The format of the action identifiers 516 can be predetermined and known to both the firmware 506 and to the operating system 508. The BER generator 510 in the firmware 506 can generate the boot error record 512 in the manner described above and make the boot error record 512 available to the operating system 508. Once the BER handler 518 in the operating system 508 obtains the boot error record 512 and determines that the boot error record 512 includes one or more action identifiers 516, the BER handler 518 can access one or more data structures 520 that associate the action identifiers 516 with executable instructions 522. In the depicted example, the data structure(s) 520 associate the first action identifier 516-1 with a first set of executable instructions 522-1, the second action identifier 516-2 with a second set of executable instructions 522-2, and the $N^{th}$ action identifier 516-N with an $N^{th}$ set of executable instructions 522-N. The data structure(s) 520 can be located on the computing device 502 itself, and/or the data structure(s) 520 can be in one or more other locations external to the computing device 502 that are accessible to the computing device 502.

As discussed above, once the BER handler 518 determines at least one desired error mitigation action that is identified in the boot error record 512, the BER handler 518 can cause the desired error mitigation action(s) to be performed. In some embodiments, the BER handler 518 can be configured to cause the instructions 522 associated with a particular action identifier 516 to be executed when the BER handler 518 obtains a boot error record 512 that includes the action identifier 516. Thus, in the depicted example, the BER handler 518 can be configured to cause the first set of instructions 522-1 to be executed in response to determining that the boot error record 512 includes the first action identifier 516-1, to cause the second set of instructions 522-2 to be executed in response to determining that the boot error record 512 includes the second action identifier 516-2, and to cause the $N^{th}$ set of instructions 522-N to be executed in response to determining that the boot error record 512 includes the $N^{th}$ action identifier 516-N.

Execution of a particular set of instructions 522 can cause the error mitigation action associated with the corresponding action identifier 516 to be performed. Thus, in the present example, execution of the first set of instructions 522-1 can cause the error mitigation action associated with the first action identifier 516-1 (e.g., sending error context to a remote location for analysis) to be performed, execution of the second set of instructions 522-2 can cause the error mitigation action associated with the second action identifier 516-2 (e.g., migrating one or more instances of user context that are running on the computing device 502 to another server) to be performed, and execution of the $N^{th}$ set of instructions 522-N can cause the error mitigation action associated with the $N^{th}$ action identifier 516-N (e.g., locking the computing device 502 for hardware debugging) to be performed.

Of course, the specific actions described above are provided for purposes of example only and should not be interpreted as limiting the scope of the present disclosure. It is not necessary for a boot error record 512 that is created in accordance with the techniques disclosed herein to include action identifiers 516 corresponding to these specific error mitigation actions. A boot error record 512 that is created in accordance with the techniques disclosed herein can include action identifiers 516 corresponding to other types of error mitigation actions.

Figure 6:
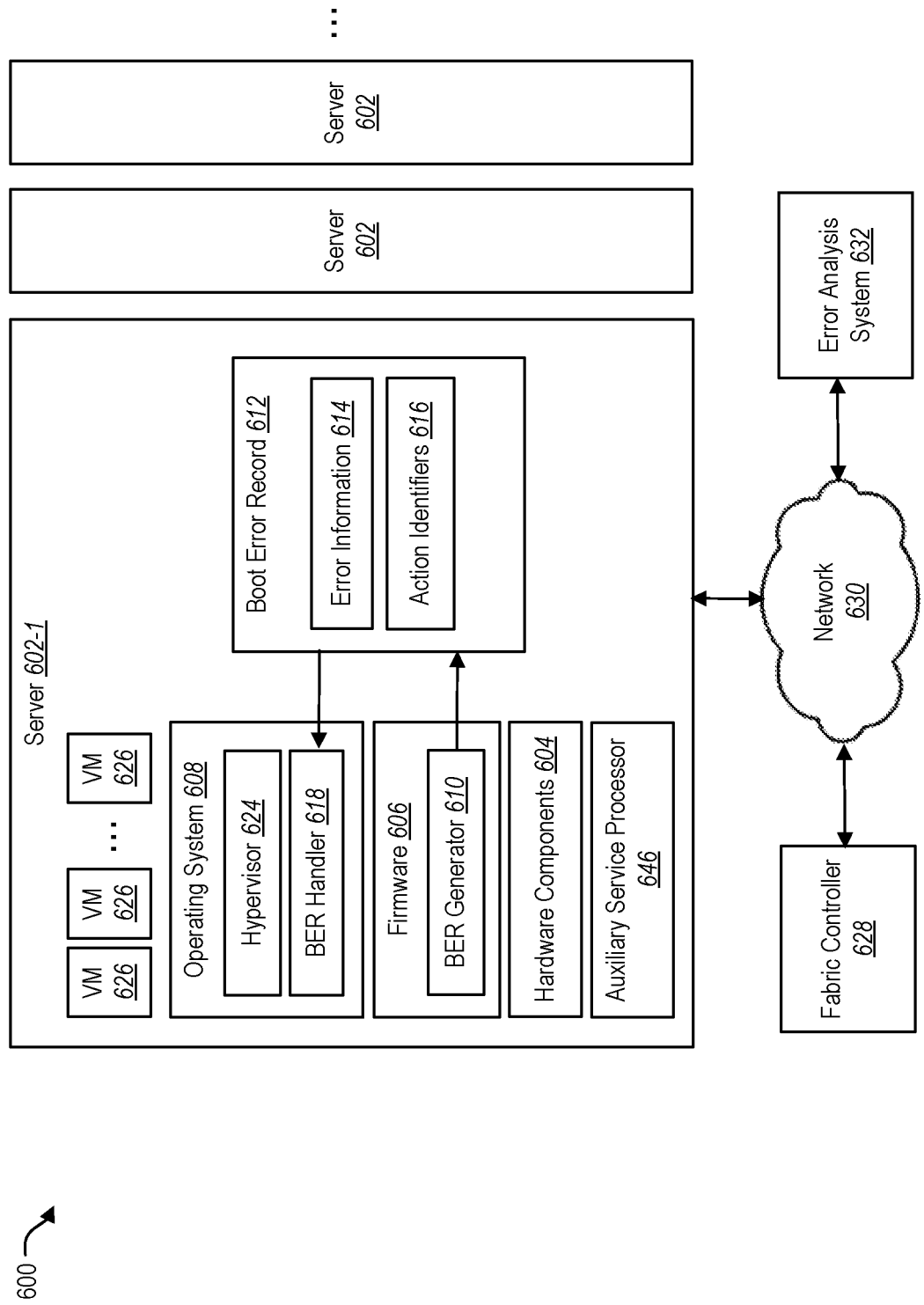
FIG. 6 illustrates an example of a cloud computing system in which the techniques disclosed herein can be utilized.

FIG. 6 illustrates an example of a system 600 in which the techniques disclosed herein can be utilized. In some embodiments, the system 600 can be a cloud computing system that includes a plurality of servers 602. FIG. 6 shows some of the components within a particular server 602-1 among the plurality of servers 602. Some or all of the other servers 602 in the system 600 can be configured similarly to the depicted server 602-1.

The server 602-1 can include some of the same components as the computing device 102 shown in FIG. 1. For example, the server 602-1 can include various hardware components 604, firmware 606, and an operating system 608. The firmware 606 can include a BER generator 610, and the operating system 608 can include a BER handler 618. These components can be similar to the corresponding components in the computing device 102 shown in FIG. 1, which were discussed above.

In the system 600 shown in FIG. 6, the server 602-1 includes a hypervisor 624. The hypervisor 624 is software that creates and runs virtual machines (VMs) 626. The hypervisor allows the server 602-1 to support a plurality of VMs 626 by virtually sharing the resources (e.g., the processor(s) and memory) of the server 602-1. In the depicted embodiment, the hypervisor 624 is shown as part of the operating system 608. In an alternative embodiment, the hypervisor 624 can be separate from the operating system 608.

As noted above, the servers 602 can be part of a cloud computing system. The cloud computing system can be a public cloud computing system. The provider of the cloud computing system can rent the use of VMs 626 on these servers 602 to customers. However, even in the context of a cloud computing system, the techniques disclosed herein are not limited to a scenario where VMs 626 are running on servers 602. For example, as discussed above, the techniques disclosed herein can be utilized in a scenario in which containers are running on servers 602, either with or without VMs 626. Also, in some embodiments, the techniques disclosed herein can be applied to a bare-metal scenario where at least some of the servers 602 in the cloud computing system only have a single tenant (either with or without VMs 626 or containers).

The servers 602 of the cloud computing system can be in electronic communication with a fabric controller 628. The fabric controller 628 can be configured to perform management operations with respect to the servers 602 of the cloud computing system. The fabric controller 628 can be a single computing device that performs the management operations or a combination of a plurality of computing devices that function together to perform the management operations. Communication between the servers 602 and the fabric controller 628 can occur via one or more computer networks 630.

The server 602-1 can also include an auxiliary service processor 646. The auxiliary service processor 646 can be a specialized microcontroller within the server 602-1, separate from the general purpose processor(s). An example of an auxiliary service processor 646 is a baseboard management controller (BMC). It can be useful for auxiliary service processors 646 to be included in servers 602 that are part of a cloud computing system because they allow system administrators to perform various tasks remotely. For example, a system administrator can use the fabric controller 628 (or another management system) to remotely communicate with an auxiliary service processor 646 to take corrective actions, such as resetting or power cycling a server 602.

The servers 602 of the cloud computing system can also be in electronic communication with an error analysis system 632. The error analysis system 632 can be configured to analyze error context received from the servers 602. In some embodiments, the error analysis system 632 can also be configured to make recommendations about changes that should be made to the servers 602 based on the results of the analysis. The error analysis system 632 can be a single computing device that performs the analysis or a combination of a plurality of computing devices that function together to perform the analysis. Communication between the servers 602 and the error analysis system 632 can occur via one or more computer networks 630.

In some embodiments, the BER generator 610 within the firmware 606 can be configured to implement the method 200 that was described above in connection with FIG. 2. Similarly, the BER handler 618 within the operating system 608 can be configured to implement the method 300 that was described above in connection with FIG. 3.

Figure 7:
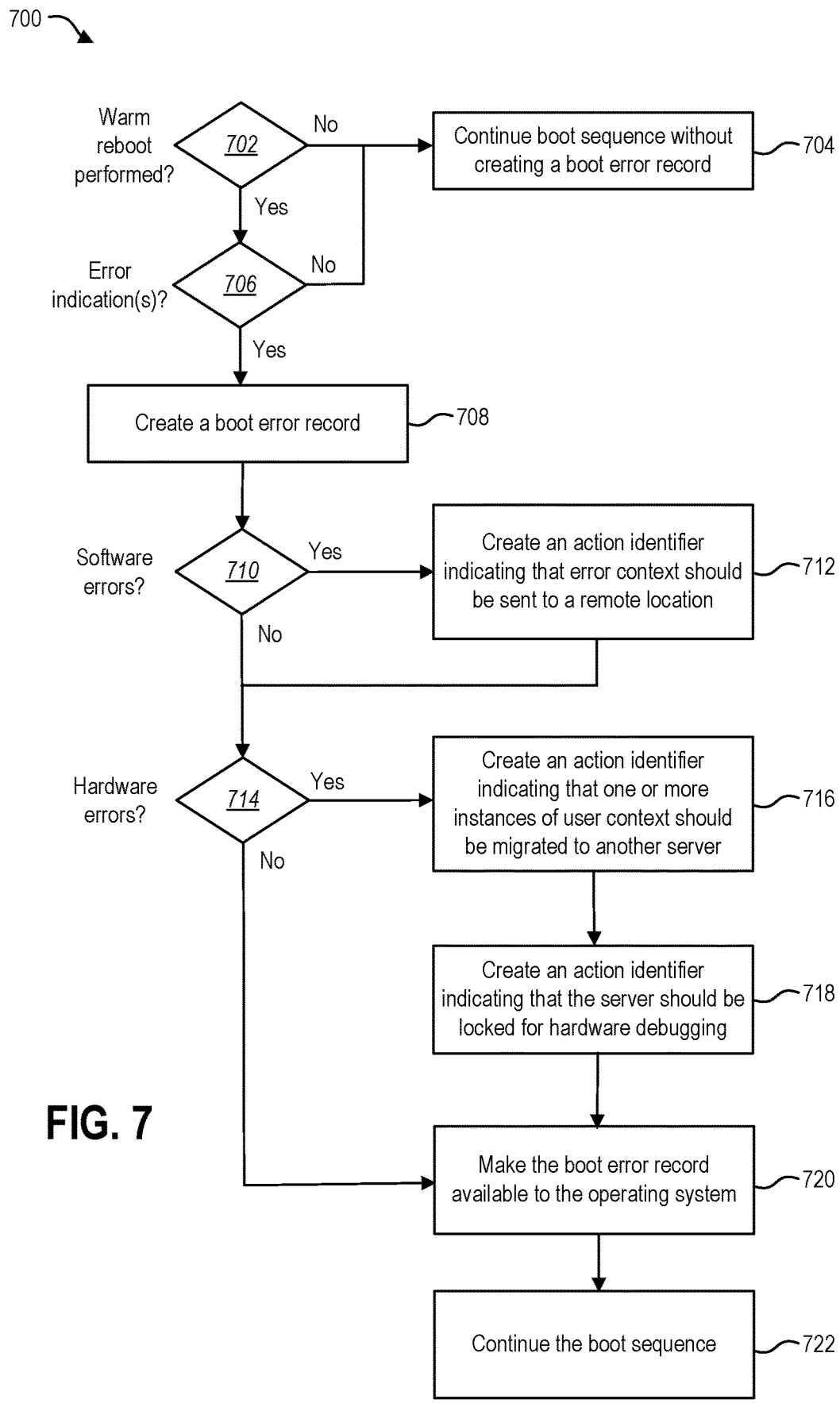
FIG. 7 illustrates an example of a method that can be performed by firmware of a server in a cloud computing system to enable certain error mitigation actions to be performed when the server experiences a failure.

Another example of a method 700 that can be implemented by the BER generator 610 within the firmware 606 will now be described in connection with FIG. 7. In particular, FIG. 7 illustrates an example of a method 700 for enabling certain error mitigation actions to be performed when a server 602-1 in a cloud computing system experiences a failure. The method 700 will be described in relation to the system 600 shown in FIG. 6. The method 700 can be implemented by the firmware 606 in the server 602-1. In particular, the method 700 can be implemented by the BER generator 610 within the firmware 606. The method 700 can be performed during a boot sequence of the server 602-1 that occurs subsequent to a failure of the server 602-1.

The method 700 can include determining 702 whether a warm reboot of the server 602-1 was performed. If it is determined 702 that a warm reboot of the server 602-1 was not performed, the method 700 can include continuing 704 the boot sequence without creating a boot error record 612.

If it is determined 702 that a warm reboot of the server 602-1 was performed, the method 700 can include determining 706 whether any error indications can be detected on the server 602-1. As discussed above, detecting an error indication can include discovering or learning about the presence of something on the server 602-1 that indicates that one or more errors have occurred. For example, detecting an error indication can include detecting an error flag 438 at a pre-determined memory location 434 in the memory of the server 602-1. As another example, detecting an error indication can include querying an auxiliary service processor 646 within the server 602-1.

If it is determined 706 that no error indications can be detected on the server 602-1, the method 700 can include continuing 704 the boot sequence without creating a boot error record 612. However, if at least one error indication is detected on the server 602-1, then the method 700 can include creating 708 a boot error record 612. The method 700 can then proceed to evaluating the type of error indication that is detected. The type of action identifiers 616 that are included in the boot error record 612 can depend on the type of error indication that is detected.

For example, the method 700 can include determining 710 whether any software errors have occurred on the server 602-1. If one or more software errors have occurred on the server 602-1, then the method 700 can include determining at least one desired error mitigation action that should be performed in response to the software error(s). In some embodiments, when one or more software errors are detected, the BER generator 610 can determine that error context should be sent to a remote location for analysis. Thus, the method 700 can include creating 712 an action identifier 616 indicating that error context should be sent to a remote location (such as the error analysis system 632 in the system 600 shown in FIG. 6) for analysis.

As discussed above, in some embodiments, an error flag 438 can be associated with one or more data structures 442 that identify one or more memory address ranges 444, and the BER generator 610 can interpret the presence of these data structure(s) 442 as an indication that only the contents of the memory corresponding to the specified memory address range(s) 444 should be sent to a remote location for analysis. In such embodiments, the action identifier 616 in the boot error record 612 can include the specified memory address range(s) 444.

The method 700 can also include determining 714 whether any hardware errors have occurred on the server 602-1. If one or more hardware errors have occurred on the server 602-1, then the method 700 can include determining at least one desired error mitigation action that should be performed in response to the hardware error(s). In some embodiments, when one or more hardware errors are detected, the BER generator 610 can determine that at least some of the instances of user context (e.g., VMs 626 and/or containers) that are running on the server 602-1 should be migrated to another server 602. Thus, the method 700 can include creating 716 an action identifier 616 indicating that one or more of the instances of user context that are running on the server 602-1 should be migrated to another server 602. In some embodiments, the action identifier 616 can indicate that all of the instances of user context that are running on the server 602-1 should be migrated to another server 602. In other embodiments, the action identifier 616 can indicate that a subset of the instances of user context that are running on the server 602-1 should be migrated to another server 602. The action identifier 616 can indicate the specific instances of user context (e.g., specific VMs 626 and/or containers) that should be migrated.

In some embodiments, when one or more hardware errors are detected, the BER generator 610 can determine that the server 602-1 should be locked for hardware debugging. Thus, the method 700 can also include creating 718 an action identifier 616 indicating that the server 602-1 should be locked for hardware debugging.

When a boot error record 612 has been created with the action identifier(s) 616 that are appropriate for the errors that have been detected, the method 700 can include making 720 the boot error record 612 available to the operating system 608 and then continuing 722 with the boot sequence. As discussed above, later in the boot sequence the operating system 608 can obtain the boot error record 612, determine the error mitigation action(s) that are identified in the boot error record 612 (as indicated by the action identifier(s) 616 in the boot error record 612), and cause those error mitigation action(s) to be performed.

Figure 8:
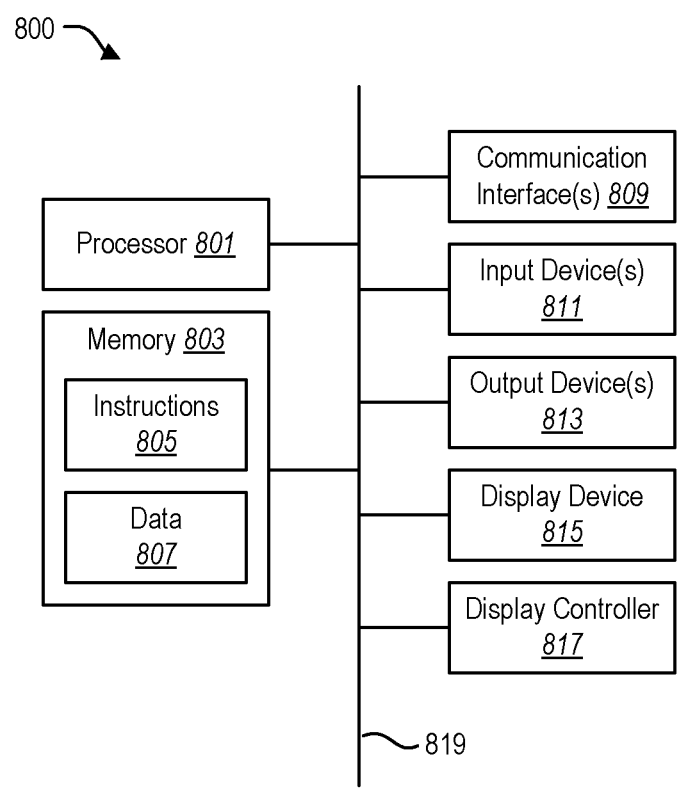
FIG. 8 illustrates certain components that can be included within a computing device.

Reference is now made to FIG. 8. One or more computing devices 800 can be used to implement at least some aspects of the techniques disclosed herein. FIG. 8 illustrates certain components that can be included within a computing device 800.

The computing device 800 includes a processor 801 and memory 803 in electronic communication with the processor 801. Instructions 805 and data 807 can be stored in the memory 803. The instructions 805 can be executable by the processor 801 to implement some or all of the methods, steps, operations, actions, or other functionality that is disclosed herein. Executing the instructions 805 can involve the use of the data 807 that is stored in the memory 803. Unless otherwise specified, any of the various examples of modules and components described herein can be implemented, partially or wholly, as instructions 805 stored in memory 803 and executed by the processor 801. Any of the various examples of data described herein can be among the data 807 that is stored in memory 803 and used during execution of the instructions 805 by the processor 801.

Although just a single processor 801 is shown in the computing device 800 of FIG. 8, in an alternative configuration, a combination of processors (e.g., an ARM and DSP) could be used.

The computing device 800 can also include one or more communication interfaces 809 for communicating with other electronic devices. The communication interface(s) 809 can be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 800 can also include one or more input devices 811 and one or more output devices 813. Some examples of input devices 811 include a keyboard, mouse, microphone, remote control device, button, joystick, trackball, touchpad, and lightpen. One specific type of output device 813 that is typically included in a computing device 800 is a display device 815. Display devices 815 used with embodiments disclosed herein can utilize any suitable image projection technology, such as liquid crystal display (LCD), light-emitting diode (LED), gas plasma, electroluminescence, or the like. A display controller 817 can also be provided, for converting data 807 stored in the memory 803 into text, graphics, and/or moving images (as appropriate) shown on the display device 815. The computing device 800 can also include other types of output devices 813, such as a speaker, a printer, etc.

The various components of the computing device 800 can be coupled together by one or more buses, which can include a power bus, a control signal bus, a status signal bus, a data bus, etc. For the sake of clarity, the various buses are illustrated in FIG. 8 as a bus system 819.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

As an example, the term "circuitry" can refer to one or more integrated circuits, where an integrated circuit can include a set of electronic circuits on a piece of semiconductor material (e.g., silicon). In some embodiments, circuitry can include programmable logic devices such as field programmable gate arrays (FPGAs) and/or complex programmable logic devices (CPLDs). In some embodiments, circuitry can include application specific integrated circuits (ASICs). As another example, the term "circuitry" can refer to one or more discrete electronic circuits that include individual electronic components. As another example, the term "circuitry" can refer to a digital circuit, an analog circuit, or a mixed-signal circuit. "Circuitry" can also include combinations of the foregoing.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for enabling error mitigation actions to be performed when a computing device experiences a failure, the method being implemented by firmware in the computing device, the method comprising:
    detecting an error indication during a boot sequence of the computing device, wherein the boot sequence occurs subsequent to a warm reboot of the computing device, and wherein the boot sequence occurs while memory in the computing device is in a self-refresh mode;
    determining at least one desired error mitigation action based at least in part on the error indication;
    creating a boot error record that identifies the at least one desired error mitigation action; and
    making the boot error record available to an operating system of the computing device.

2. The method of claim 1, wherein detecting the error indication comprises detecting an error flag at a pre-determined location in the memory of the computing device.

3. The method of claim 2, wherein:
    a data structure associated with the error flag identifies at least one memory address range; and
    the at least one desired error mitigation action comprises sending memory contents from the at least one memory address range to an error analysis system.

4. The method of claim 1, wherein detecting the error indication comprises querying an auxiliary service processor in the computing device.

5. The method of claim 1, wherein the at least one desired error mitigation action comprises sending error context to an error analysis system.

6. The method of claim 1, wherein:
    a plurality of instances of user context are running on the computing device; and
    the at least one desired error mitigation action comprises migrating at least one of the plurality of instances of user context to another computing device.

7. The method of claim 1, wherein the at least one desired error mitigation action comprises locking the computing device for hardware debugging.

8. A method for enabling error mitigation actions to be performed when a computing device experiences a failure, the method being implemented by an operating system in the computing device, the method comprising:
    obtaining a boot error record during a boot sequence of the computing device, wherein the boot sequence occurs subsequent to a warm reboot of the computing device, wherein the boot sequence occurs while memory in the computing device is in a self-refresh mode, and wherein the boot error record is created earlier in the boot sequence by firmware of the computing device;
    determining at least one desired error mitigation action that is identified in the boot error record; and
    causing the at least one desired error mitigation action to be performed.

9. The method of claim 8, wherein causing the at least one desired error mitigation action to be performed comprises causing error context to be sent to an error analysis system.

10. The method of claim 8, wherein:
    the computing device is a server that is part of a cloud computing system;
    a plurality of instances of user context are running on the server; and
    causing the at least one desired error mitigation action to be performed comprises causing at least one of the plurality of instances of user context to be migrated to another server.

11. The method of claim 8, wherein causing the at least one desired error mitigation action to be performed comprises causing the computing device to be locked for hardware debugging.

12. The method of claim 8, wherein obtaining the boot error record comprises searching a pre-determined memory location that is known to both the operating system and the firmware in the computing device.

13. The method of claim 8, wherein:
    the boot error record comprises a plurality of action identifiers corresponding to a plurality of error mitigation actions to be performed; and
    the method further comprises accessing one or more data structures that associate the plurality of action identifiers with instructions that, when executed, cause the plurality of error mitigation actions to be performed.

14. A server in a cloud computing system, the server being configured to enable error mitigation actions to be performed when the server experiences a failure, the server comprising:
    one or more processors;
    memory in electronic communication with the one or more processors;
    firmware comprising a boot error generator that is executable by the one or more processors to:
        detect an error indication during a boot sequence of the server, wherein the boot sequence occurs subsequent to a warm reboot of the server, and wherein the boot sequence occurs while the memory is in a self-refresh mode;

determine at least one desired error mitigation action based at least in part on the error indication; and create a boot error record that identifies the at least one desired error mitigation action; and an operating system comprising a boot error handler that is executable by the one or more processors to:

obtain the boot error record during the boot sequence; and cause the at least one desired error mitigation action that is identified in the boot error record to be performed.

15. The server of claim 14, wherein detecting the error indication comprises detecting an error flag at a pre-determined location in the memory of the server.

16. The server of claim 15, wherein:

a data structure associated with the error flag identifies at least one memory address range; and the at least one desired error mitigation action comprises causing memory contents from the at least one memory address range to be sent to an error analysis system.

17. The server of claim 14, wherein:

the server further comprises an auxiliary service processor; and detecting the error indication comprises querying the auxiliary service processor.

18. The server of claim 14, wherein causing the at least one desired error mitigation action to be performed comprises causing error context to be sent to an error analysis system.

19. The server of claim 14, wherein:

the server further comprises a plurality of instances of user context that are running on the server; and causing the at least one desired error mitigation action to be performed comprises causing at least one of the plurality of instances of user context to be migrated to another server.

20. The server of claim 14, wherein causing the at least one desired error mitigation action to be performed comprises causing the server to be locked for hardware debugging.

* * * * *